E. A. HITCHCOCK.
METER.
APPLICATION FILED OCT. 12, 1910.
1,018,561.
Patented Feb. 27, 1912.
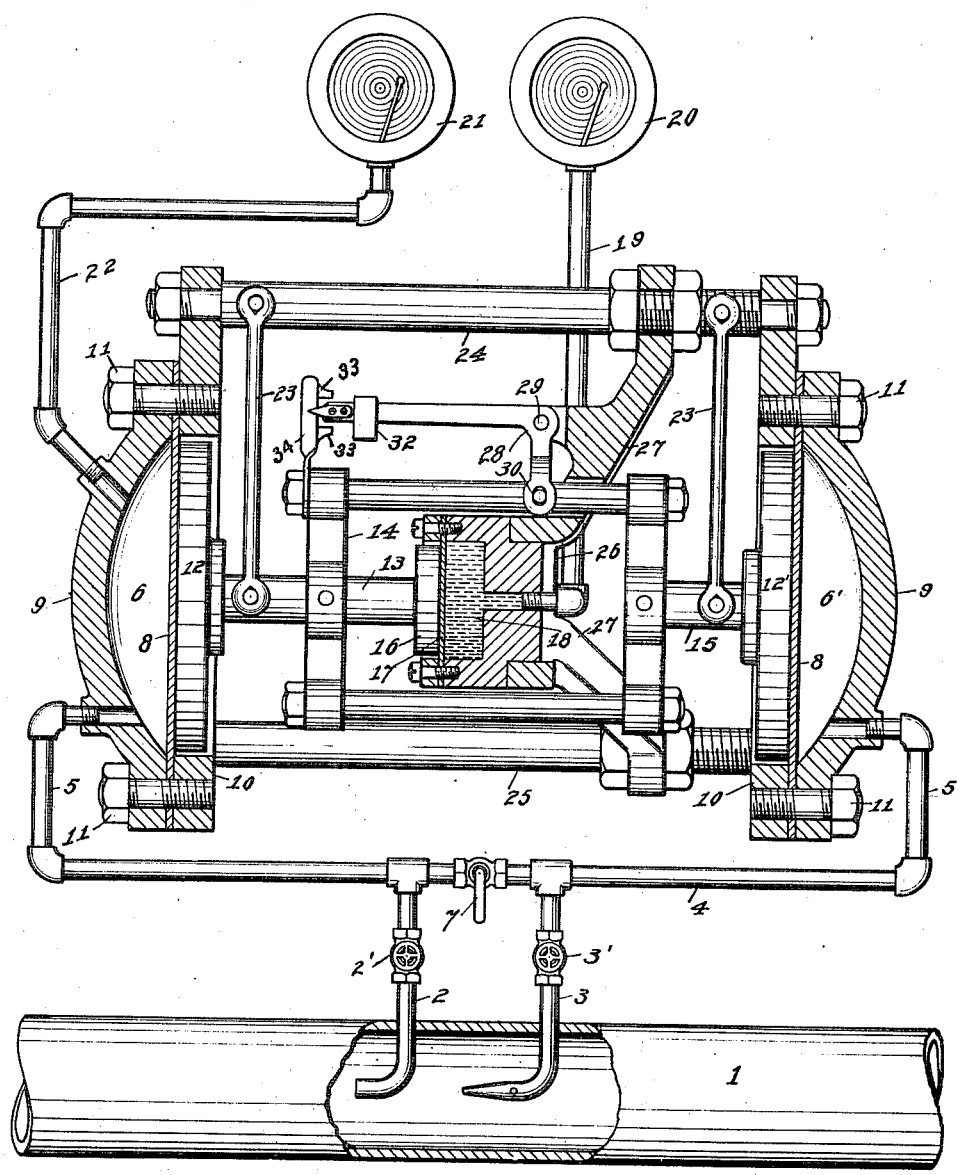

UNITED STATES PATENT OFFICE.

EMBURY A. HITCHCOCK, OF COLUMBUS, OHIO.

METER.

1,018,561.   Specification of Letters Patent.   Patented Feb. 27, 1912.

Application filed October 12, 1910. Serial No. 586,702.

*To all whom it may concern:*

Be it known that I, EMBURY A. HITCHCOCK, a citizen of the United States, residing at Columbus, in the county of Franklin and State of Ohio, have invented certain new and useful Improvements in Meters, of which the following is a specification.

This invention relates to certain novel and useful improvements in meters, and has particular application to an instrument of the class described, for registering the pressure due to the velocity of gas or other liquids flowing through a pipe.

In carrying out my invention, it is my purpose to provide a meter capable of registering with positiveness and accuracy, and one which will embody the desired features of simplicity and durability coupled with economy in cost of production and operation.

While in the present instance, I have described my invention as employed as a gas meter, merely to illustrate its use, I wish it to be understood that I do not limit it in its application to this particular use, as it is adapted for measuring other fluids, such as water. Nor do I limit myself to all the details of construction set forth herein, as modification and variation may be made without departing from the spirit of the invention, or exceeding the scope of the claims.

This invention consists in the construction, combination and arrangement of parts set forth in and falling within scope of the appended claims.

In the accompanying drawings, the figure is a side view, partly in elevation and partly in section of a meter embodying my invention and showing its application to a pipe line.

Referring now to the drawing in detail, the numeral 1 indicates an ordinary pipe line, through which the fluid to be measured is flowing under pressure. Projecting into the pipe is the ordinary Pitot tube 2, for the dynamic pressure and the tube 3 for the static pressure, these tubes leading to the meter pipe 4, the branches 5 of which communicate with the chambers 6 and 6' at opposite sides of the meter.

The numeral 7 indicates a valve in the line 4 between the tubes 2 and 3, for the purpose hereinafter described. The chambers 6—6' are formed by the diaphragms 8—8 made of any suitable material, such as leather, rubber or metal, and the walls 9—9, the diaphragms being held between the disk rings 10—10 and walls 9—9 by bolts or screws, or other means, as shown at 11, the pressures from the Pitot tubes being transmitted to the diaphragms through the branch pipes 5, the diaphragms pressing or bearing against the disks 12—12'. The rod 13 is fast to the cross head 14, the latter in turn being connected to the disk 12' through the rod 15, so that the two disks 12—12' are rigidly connected, and the pressures in the chambers therefore oppose each other. At the inner end of the rod 13 is the head 16, bearing against the diaphragm 17 of relatively small or reduced size, the chamber 18 covered by the small diaphragm and the communicating tube 19 of the gage 20, being completely filled with a non-compressible liquid, so that the unbalanced pressure in the chamber 6 is transferred to the recording or indicating gage 20, and is multiplied proportionately to the reduced size of the diaphragm 17, relative to the diaphragm 8.

The pressure in the chamber 6, is registered by the recording gage 21 through the pipe 22. The cross head 14 is suspended by the hanger rods 23 connected to the top bar 24 joining the frame rings 10, in order that there may be no contact between the disks 12—12' and the frame of the apparatus. Companion bars 25 join the frame rings at their lower ends. The chamber 18 is supported by the spider 26 having the arms 27 connected to the bars of the frame. The bell crank lever 28 is pivoted to one of the arms 27 and is also loosely connected to the cross head at 30. The long arm of the lever is provided with a shifting weight 32 for counteracting or compensating for the weight of the column of fluid in the pipe of the gage 20, the long arm of the lever having the pointer for indicating when the yoke cross head is properly positioned. In order to limit the swinging movement of the pointer, I provide the stops 33—33, which are carried by the vertical arm 34.

I wish it to be understood that any desired means may be employed for filling the chamber 18 with a non-compressible fluid, such as oil or the like.

The operation of my improved meter, is as follows: When in operation the valve 7 is closed, the valves 2' and 3' are opened and the excess pressure of the chamber 6 over that in the chamber 6', will be due solely to velocity, which in the case of flowing gas, does not as a rule run over 4" or 5" of water. This low pressure is therefore increased in proportion to the area of the disks 8 and the disk 17 and as long as the chamber 18 and the connecting tube to the gage 20, are completely filled with a non-compressible liquid, the pressure will be immediately registered on the gage 20, with no perceptible movement on the part of the disks and cross head.

What I claim, is—

1. A gage comprising a frame portion, a plurality of disks suspended from said frame, a chamber at each end of the frame, each of said chambers having a wall formed of a diaphragm said disks being respectively adjacent said chambers and bearing against the diaphragms thereof, a third chamber within the meter containing a non-compressible fluid, a recording device connected to said third chamber and having a tube for the non-compressible fluid, a diaphragm wall for said last mentioned chamber, a rigid element interposed between said disks and said last mentioned diaphragm wall, and a second recording device connected to one of said chambers for indicating static pressure therein.

2. A gage comprising a frame portion, a chamber at each end thereof, a diaphragm for each chamber, a plurality of members bearing against said diaphragms, a central chamber, a diaphragm for said central chamber, a member bearing against said last mentioned diaphragm, connections between said member and the members engaging against end diaphragms, recording mechanism connected with the central chamber, a recording device connected with one of the end chambers, and means for freely supporting the members bearing against the diaphragms at the end chambers from the frame.

3. The combination with a frame, of a plurality of end chambers, a swinging yoke suspended from the frame, a plurality of disks connected to said yoke, a diaphragm for each end chamber against which said disks respectively bear, a central chamber, a diaphragm for said central chamber, a disk bearing against said diaphragm, connections between said disk and the disks bearing against the end diaphragms a fluid recording mechanism connected to said central chamber, the latter being filled with a non-compressible fluid, and means for recording the static and dynamic pressures connected to one of the end chambers.

4. The combination with a frame, of a plurality of end chambers, diaphragms forming one of the walls of each end chamber, means bearing against said diaphragms for transmitting the pressures in the chambers, means for freely supporting the pressure transmitting means, a central chamber of relatively less size than the end chambers, and a diaphragm for said central chamber, a member controlled by said first named means and bearing against said diaphragm, a recording gage for measuring the velocity of flow connected to said central chamber, such central chamber being filled with a non-compressible fluid, a pressure recording device connected to one of said end chambers, an indicating lever connected to the supporting means, and normally shut-off connections between the end chambers.

In testimony whereof I affix my signature in presence of two witnesses.

EMBURY A. HITCHCOCK.

Witnesses:
  A. L. PHELPS,
  INGLE A. MORRIS.